Nov. 22, 1927.
H. L. TANNER
DAMPING GYROSCOPIC COMPASS
Filed July 29, 1921
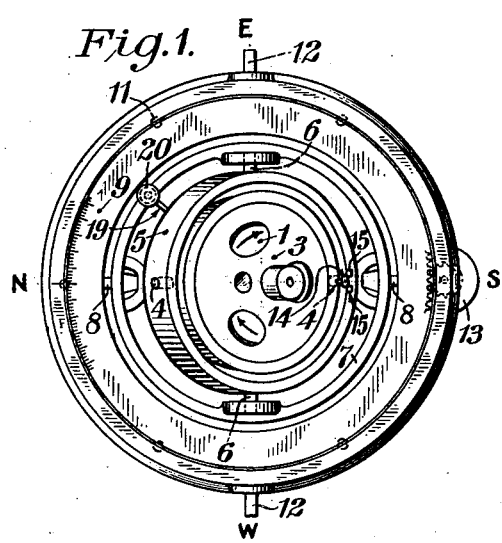
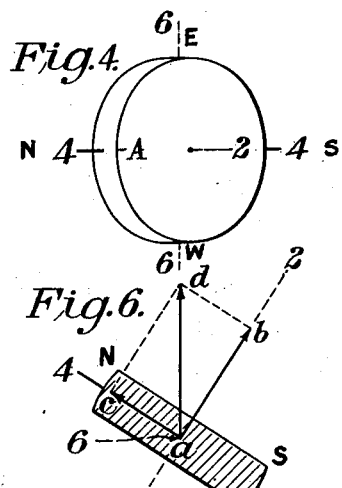
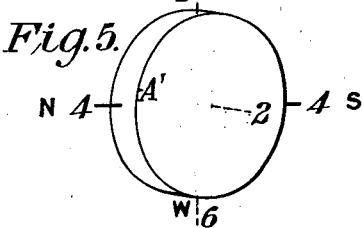
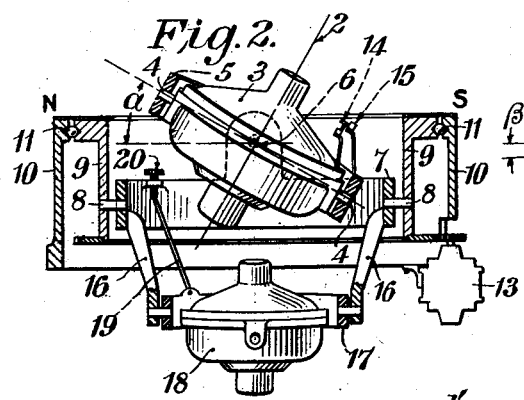
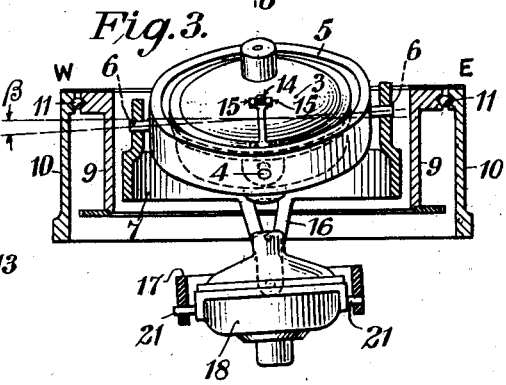
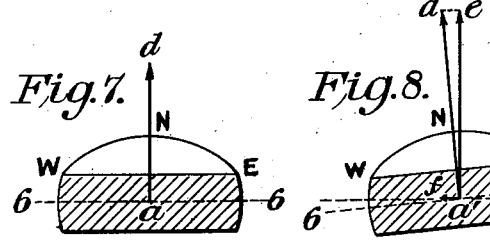
INVENTOR
Harry L. Tanner,
BY
Moakley and Gill
ATTORNEYS.

Patented Nov. 22, 1927.

1,650,162

UNITED STATES PATENT OFFICE.

HARRY L. TANNER, OF BROOKLYN, NEW YORK, ASSIGNOR TO FORD INSTRUMENT COMPANY, INC., OF NEW YORK, N. Y., A CORPORATION OF NEW YORK.

DAMPING GYROSCOPIC COMPASS.

Application filed July 29, 1921. Serial No. 488,349.

This invention relates to damping gyroscopic compasses and more particularly to the damping of the oscillations about the meridian of the gyroscopic elements of compasses of the type shown in my co-pending application Serial #469,201 filed May 13, 1921.

The compass shown in that application comprises a gyroscopic element consisting of a mass which is arranged to spin about an axis having a substantially constant inclination to the surface of the earth and normally bearing a fixed relation to the plane of the meridian, and a case which surrounds and serves as a support for the mass and may turn in the plane of the latter about the inclined axis independently of the rotary movement of the mass within the case. The case is mounted within an inner supporting member upon an axis lying in the plane of the case and in the plane of the meridian when the case occupies its normal position. The inner supporting member is mounted upon a normal east-west axis within another supporting member which in turn is mounted upon an inner frame which may carry the compass card and is in turn movably mounted upon an outer frame which is mounted to turn with the craft on which the compass is carried. The inner frame is adapted to be moved by a driving element, such as a servo-motor, controlled by contact mechanism consisting of two relatively movable parts one of which is connected to the case, or to a part of the instrument adapted to move with the case, and the other of which is connected to some other part of the instrument, such as one of the supporting members, which bears a fixed relation to the case when the latter occupies its normal position, but which is displaced with respect to the case when the latter is turned about the rotatable mass by relative movement between the inner and outer frames due to changes in course of the craft or while the gyroscopic element is seeking the meridian, which it is caused to do by the effect of gravity upon the element which is made pendulous about its supporting axes.

In a compass such as described above, it is necessary to damp the oscillations of the gyroscopic element about the meridian in order that the instrument may be suitable for navigational purposes. By way of illustration, two arrangements which may be employed for this purpose have been shown in my copending application in connection with the compass forming the subject matter thereof. One arrangement consists of a mass which is attached to the case in the manner of a pendulum with its axis of oscillation disposed at an angle to the plane of the meridian whereby a component of its weight acts about the supporting axis of the element, which lies in the plane of the meridian, to reduce the deviation of the element from its normal inclination as it seeks the meridian and thereby damp its oscillations. Another arrangement that may be employed consists of a pair of liquid containing reservoirs mounted on the element in the north south plane and connected by a restricted passage.

As explained in detail in my co-pending application, the use of a damping arrangement such as the first one referred to above, requires that a correction be applied for latitude in order that indications may be obtained free from error. It also requires the use of extra parts. The employment of a liquid level arrangement, such as shown in my copending application, while eliminating the necessity for applying a latitude correction, also requires the addition of extra parts and a careful regulation of the flow of liquid between the reservoirs.

This invention has for an object the damping of the oscillations of a gyroscopic compass, particularly of the type shown in my co-pending application, by the action of the torque which causes such oscillations and in such a manner that indications may be obtained which will be practically free from error, so that the necessity for applying corrections will be eliminated, and auxiliary devices may be dispensed with, whereby the construction of the instrument is simplified and its cost is reduced.

In accordance with the invention, a gyroscopic element having its plane of rotation at a substantial angle to the horizontal is moved by the effect of the meridian seeking torque about an axis which bears such a relation to the spinning axis of the rotor that movement of the case of the element about the spinning axis will have a component which will cause a change in the inclination of the element in a direction tending to reduce the deviations of the element from its normal inclination as it oscillates about the meridian, thus damping the oscillations.

This result may be obtained by giving an inclination to an axis of the gyroscopic element lying in the plane of the element and perpendicular to the axis upon which the element is mounted. The element thus has in addition to the normal north-south inclination which it possesses in accordance with the invention of my copending application an east-west inclination. It results from these two inclinations of the element that its high and low points will be displaced sidewise from the positions which they occupy when the element is arranged as shown in that application. Since the gyroscopic element is pendulous, a torque will be applied about its east-west supporting axis during meridian seeking oscillations to cause precession about the other supporting axis. When the high and low points of the element are displaced in accordance with the present invention, the movement of the element caused by such precession in combination with the movement imparted to the case of the element by the servo-motor will have a component which will tilt the element in a direction to reduce the deviations from its normal inclination as it oscillates about the meridian, thereby damping the oscillations and rendering the compass suitable for use upon a moving craft.

The particular nature of the invention will appear more clearly from a description thereof taken in connection with the accompanying drawings in which—

Figure 1 is a plan view, with parts omitted for the sake of clearness, of a simple form of compass adapted to be damped in accordance with this invention, the parts being shown in the relation which they occupy when the craft upon which the compass is mounted is heading north, Figure 2 is a simplified elevation, partly in section of the instrument of Figure 1, viewed from the west, Figure 3 is a similar view of the instrument viewed from the south, Figure 4 is a diagrammatic representation in plan of the gyroscopic element of an undamped instrument, Figure 5 is a similar representation of the gyroscopic element arranged in accordance with this invention, Figure 6 is a diagrammatic representation in sectional elevation of the gyroscopic element with a vector diagram superimposed thereon, Figure 7 is a similar representation of the gyroscopic element of Figure 4 viewed at right angles to Figure 6 and Figure 8 is a corresponding representation of the gyroscopic element of Figure 5.

Referring particularly to Figures 1, 2 and 3, the instrument comprises a gyroscopic rotor 1 of any suitable construction, the axis 2—2 of which is mounted in upper and lower bearings of a case 3 surrounding the rotor and provided with ventilation apertures as indicated in Figure 1. The case 3 is provided with trunnions 4, 4 mounted in bearings in an inner ring 5 which, in turn, is provided with trunnions 6, 6 mounted in bearings in a second ring 7 which, on account of its function will be hereinafter referred to as the stabilized ring of the instrument. The gyroscopic element and its supporting ring 5 are mounted in an inclined position as shown most clearly in the elevational view Figure 2 by displacing the axis 6—6 from the center of gravity of the element so that the element is pendulous and maintains a certain inclination $\alpha$ to the surface of the earth when the rotor is not spinning.

As explained in detail in my copending application referred to above, this angle will be constant for all positions of the compass, but when the rotor is spinning the inclination of the element will differ from its inclination when the rotor is at rest by an angle which depends upon the latitude and another angle which depends upon the east west component of the speed of the craft upon which the compass is carried.

The stabilized ring 7 is provided with trunnions 8, 8 disposed at right angles to the trunnion axis 6—6 and in the plane of the trunnion axis 4—4. The trunnions 8, 8 are mounted in bearings in an inner frame or shell 9 adapted to be power driven and bearing a scale graduated in units of angular measure. This frame is rotatably mounted within an outer frame or shell 10 as by means of balls 11. The frame 10 bears the lubber's line of the compass and is provided with trunnions 12, 12 adapted to fit in bearings in the gimbal rings of the binnacle, which have been omitted from the drawing for the sake of simplicity.

The element 9 is adapted to be driven by a servo-motor 13 in any suitable manner, as by means of a pinion meshing with a gear attached to the element. The circuit of the servo-motor is controlled by a device consisting of a contact 14 mounted on the case and adapted to engage one or the other of two contacts 15 mounted upon the ring 5 to cause the servo-motor to rotate in one direction or the other. For simplicity the circuit connections between the device and the motor have been omitted.

The stabilized ring 7 is provided with a pair of depending brackets 16 disposed in the north-south plane and carrying at their lower ends a ring 17, within which is mounted a stabilizing gyroscope 18 having its rotor axis substantially vertical. Connected to the ring 17 is a member 19 which at its other end is attached to an adjusting device 20 mounted on the stabilized ring 7, whereby the planes of the rings may be adjusted relatively to each other for the purpose of applying the necessary corrections for course and speed of the craft upon which the compass is mounted, as explained in detail in my copending application referred to above.

In the form of instrument shown in that application the only permanent inclination α of the gyroscopic element, consisting of the rotor 1 and case 3, is about the east-west axis 6—6, which is horizontal, so that the element occupies the position shown in Figure 4 with its highest point A in the vertical plane of the axis 4—4. In accordance with this invention an axis of the gyroscopic element lying in the plane of the element and perpendicular to the axis 4—4 is also given a permanent inclination β by balancing the element so that one side, the east side as shown herein, is higher than the other side as shown most clearly in Figure 3. The highest point of the element will thus be displaced to one side of the vertical plane of the axis 4—4, as shown at A' in Figure 5. The axis 2—2 instead of lying in the plane of the meridian as in the form of instrument shown in my copending application will thus be inclined to this plane. The plane of the inner ring 5 is preferably given a corresponding inclination β, as by elevating its east trunnion 6 as compared with its west trunnion 6, or, in case it is desired to keep the axis 6—6 horizontal, the trunnions 6, 6 may be shifted to points differing from ninety degrees from the axis 4—4. In either case the supporting axis 4—4 of the gyroscopic element will make an angle substantially different from ninety degrees with a horizontal axis lying in its plane of rotation. The contact 14 upon the case 3 and the contacts 15, 15 upon the ring 5 are so arranged that they occupy their neutral position when the gyroscopic element is upon the meridian with its plane coinciding with the plane of ring 5. If the element does not occupy such a position the contact 14 will be in engagement with one or the other of the contacts 15 to cause the servo-motor 13 to be energized to turn the frame 9, the ring 7, the ring 5, and the case 3 attached thereto by the trunnions 4, 4, in a direction to turn the case about the axis of the rotor until it assumes such a position that the contact 14 occupies its normal relation to contacts 15, 15 with the entire element balanced in its tilted position about the axis 4—4. In other words, the action of the servo-motor will be such as to maintain the rotor and case in their inclined position with respect to the axis 4—4.

As shown most clearly in Figure 3 the plane of rotation of the stabilizing gyroscope 18 is arranged parallel to the inclined axis 6—6 of the main gyroscope, as by tilting the ring 17 within which the stabilizing gyroscope is mounted upon trunnions 21, 21. This inclination of the stabilizing gyroscope is for the purpose of preventing errors which would otherwise be introduced if the plane of the main gyroscope were tilted by an angle β without a corresponding tilt of the plane of the stabilizing gyroscope.

In considering the meridian seeking action of the instrument described above it will be assumed that the rotor 1 of the main gyroscope is turning clockwise as indicated by the arrows appearing at the ventilating apertures in Figure 1. It will also be assumed that the contact 14 occupies its neutral position with respect to the two cooperating contacts 15 so that the servo-motor 13 is not energized. It will be most convenient to regard the element 9 as having been turned in a clockwise direction through 90° from the position shown in Figure 1 so that the axes 4—4 and 8—8 lie in an east-west direction with the high side of the gyroscopic element toward the east.

In accordance with the principle of the gyroscope the plane of rotation of the rotor 1 will remain fixed in space. As the earth turns from under the rotor due to its rotation, the high side of the rotor will rise relatively to the surface of the earth carrying the case with it. This will cause the pendulous mass of the rotor and case to be shifted from its position of equilibrium. This displacement will produce a torque about the supporting axis 6—6 which will cause the rotor and case to precess about the inclined axis 4—4, thus displacing their plane with respect to the plane of the inclined ring 5. This precession of the rotor and case will shift the contact 14 from its neutral position with respect to the contacts 15 into engagement with one of these contacts, thereby energizing the servo-motor 13 so that it rotates in a direction to turn the element 9 counter-clockwise to carry the axes 4—4 and 8—8 toward the meridian. As the movable parts of the instrument turn toward the meridian the inclination of the gyroscopic element will gradually increase as the earth continues to turn away from under it, thus increasing the torque about the axis 6—6. The rotor and case will therefore precess about the axis 4—4 at an increasing rate, and the contacts 14 and 15 will keep the servo-motor energized and the element 9 in motion. The axes 4—4 and 8—8 will thus be carried past the meridian and toward the west. This westerly movement will continue until the contact 14 again assumes its neutral position with respect to the contacts 15 to de-energize the servo-motor 13. This will not occur until precession about the axis 4—4 has ceased due to the absence of torque about the axis 6—6. This last named condition will obtain when the parts of the instrument have turned so far toward the west that the gyroscopic element lies at its normal inclination with respect to the surface of the earth, due to the fact that in the new position of the element the earth is turning toward the plane of the rotor instead of away from it as at the beginning of the cycle of operations described above.

After the gyroscopic element has reached the western limit of its oscillation the movement of the earth toward it will result in a depression of its high side relatively to the surface of the earth due to the fixity of the plane of rotation of the rotor. This depression of the high side of the element will result in shifting its center of gravity to produce about the horizontal axis 6—6 a torque which will be in the opposite direction to that produced when the element is at its eastern limit of oscillation. This torque will cause precession of the rotor and case about the axis 4—4 in such a direction as to shift the contact 14 from its neutral position with respect to the contacts 15 into engagement with the other contact 15 opposite to that which was engaged by the contact 14 during the east to west movement of the gyroscopic element. The servo-motor 13 will thus be energized to rotate in a direction to turn the power driven element 9 clockwise thereby swinging the axes 4—4 and 8—8 across the meridian toward the east. As the parts move from the west toward the meridian the inclination of the gyroscopic element with respect to the surface of the earth will continue to decrease since the earth is turning toward the element. The torque about the axis 6—6 due to the shifting of the center of gravity of the element will thus be increased as will also the precession of the rotor and case about the axis 4—4. If the compass be undamped its gyroscopic element will cross the meridian from west to east with the axis 4—4 depressed as far below its normal inclination as it was raised above this inclination when it crossed the meridian from east to west.

The damping action of the instrument will appear most clearly with the aid of the diagrams constituting Figs. 4 to 8 inclusive, and in connection with this explanation the action of an undamped gyroscopic element, such as shown in Fig. 4, will be considered first.

During the oscillations of such an element there will be a relative movement of the case with respect to the rotor about the axis 2—2 of the latter independently of the rotation of the rotor within the case. In other words, during meridian seeking oscillations the case 3 will turn in the plane of the rotor about the axis 2—2 common to it and the rotor, while the rotor is spinning about the same axis. At the same time that the case is turning about the rotor axis 2—2 it is also precessing about its trunnion axis 4—4 due to the torque about the axis 6—6.

These movements of the case may be represented by a vector diagram, as in Figure 6, in which the gyroscopic element is shown in section along the plane determined by the axes 2—2 and 4—4. The vector $ab$ represents the movement of the case about the axis 2—2, while the vector $ac$ represents the movement of the case due to its precession about the axis 4—4 caused by the torque about the axis 6—6. The resultant of these two vectors is a vector $ad$ lying in the plane determined by the axes 2—2 and 4—4, and in a vertical plane through the axis 6—6. In the case of an undamped element, such as shown in Figure 4, the plane of the axes 2—2 and 4—4 is vertical so that the vector $ad$ is vertical, showing that the resultant movement of the gyroscopic element is about a vertical axis. This vector represents the entire movement of the element, except that due to the rotation of the earth, which for the purpose of the present explanation of the damping action may be disregarded.

Considering the gyroscopic element shown in Figure 5 in which the plane of the element has been tilted through an angle $\beta$, which for clearness of disclosure is somewhat exaggerated over that which would ordinarily obtain in practice, it will be seen that the axis 2—2 about which the case is moved by the servo-motor lies in a plane which is inclined to the vertical. The movement of the case about the axis 2—2 and precession of it and the rotor about the axis 4—4 may be represented by the vector diagram of Figure 6, but on account of the tilt $\beta$ of the element the plane of the axes 2—2 and 4—4 in which the resultant vector $ad$ lies is inclined to the vertical. This is shown most clearly in Figure 8 which represents the gyroscopic element in section in a vertical plane through the axis 6—6. The resultant vector $a'd'$ lies in this plane and in the plane of the axes 2—2 and 4—4, and as in the case of the vector $ad$ of Figure 6 it represents the entire movement of the gyroscopic element, except that due to the movement of the earth, which may be disregarded.

The vector $a'd'$ may be resolved into vertical and horizontal components lying in the vertical plane through the axis 6—6. The component $a'e$ represents the movement of the element about a vertical axis while the component $a'f$ represents a movement of the element about a horizontal axis.

It has been explained that as the gyroscopic element oscillates about the meridian its inclination will vary from the normal inclination α, being greater than this angle during movement from east to west and less than this angle during movement in the opposite direction. In both cases the center of gravity of the element will be raised from its normal position vertically below the axis 6—6 and it is this shifting of the pendulous mass of the element which produces the torque which causes the element to seek the meridian. The effect of the movement of the element represented by the component a′ f will be to lessen its deviation from the normal inclination as it moves back and forth across the meridian. In other words, this component represents a movement about a horizontal axis in a direction tending to lower the center of gravity of the element and bring it back to its normal position with respect to such an axis, thereby damping the oscillations about the meridian.

The difference between the undamped and damped forms of gyroscopic element may also be seen by comparing Figure 7 with Figure 8. In the former figure the resultant a d lies in the vertical planes of the axis 6—6 on the one hand and the axes 2—2 and 4—4 on the other hand, and it has no horizontal component, such as does the resultant a′ d′ of Figure 8. This means that there is no component movement about a horizontal axis, that is about the axis 6—6 in the undamped form of element, and therefore no damping effect when the element is arranged as in Figure 4 with its highest point A in the plane of the axis 4—4.

If such an undamped gyroscopic element be not affected by any other external forces, the friction between its moving parts would cause its oscillations to gradually diminish in amplitude until it reached a settling point with its axis 4—4 lying in the plane of the meridian and at its normal inclination to the surface of the earth. The time required for such settling of the element would be too long even if the compass were used on land, but if it were used on shipboard, as would be the usual case, the impulses due to the rolling of the ship and other causes would cause the instrument to oscillate indefinitely so that it might never settle upon the meridian.

When the element is arranged in accordance with this invention with its plane inclined at an angle β, the inclination of the element about the axis 6—6, or in other words, the inclination of its north-south axis 4—4, rapidly approaches the normal value α during the oscillations about the meridian, and the element settles with its axis 4—4 lying in the plane of the meridian and at its normal inclination with respect to the surface of the earth. This damping of the element is obtained without the use of any auxiliary devices so that the structure of the instrument is simplified, its cost is reduced and all of the other disadvantages attending the use of such devices are eliminated.

As explained in detail in my copending application referred to above, an undamped form of gyroscopic element, arranged like the one shown in Figure 4 herein, automatically takes care of changes in latitude of the compass without the necessity for applying corrections, but when a damping arrangement consisting of a mass suspended from the case of the element, as shown in that application, is employed a latitude correction is required, which may be applied by shifting the stabilized ring 7 by means of the member 19 and adjusting device 20. When the damping arrangement of the present invention is employed there is no necessity for applying a latitude correction because the gyroscopic element is subject to practically no deviation due to changes in position or the compass upon the surface of the earth, the same as is an undamped form of compass. In other words the tilt β imparted to the element, which will be slight, will not materially affect the action of the element in automatically taking care of changes in latitude.

While an application of the invention to the particular form of gyroscopic compass shown in my copending application Serial No. 469,201 has been shown and described herein, it will be understood that it may be applied to gyroscopic compasses of other forms and that various changes in the details of construction may be made without departing from the principle of the invention as defined in the appended claims.

I claim:—

1. In a meridian seeking gyroscopic compass, a gyroscopic element, and means for supporting the element upon two mutually perpendicular axes, both of which are inclined to the surface of the earth.

2. In a meridian seeking gyroscopic compass, a gyroscopic element and means for supporting the element with its spinning axis inclined to the plane of the meridian and also at a considerable angle to the surface of the earth, when the element occupies its normal direction indicating position.

3. In a meridian seeking gyroscopic compass, a gyroscopic element and means for supporting the element with its spinning axis inclined to the plane of the meridian and also at a considerable angle to the surface of the earth, when the element occupies its normal direction indicating position, the upper end of the spinning axis of the element lying in the south-west quadrant of the plane of the meridian and an east-west vertical plane.

4. In a gyroscopic apparatus, the combination of a rotatable mass, a support for the mass, a member within which the support is mounted upon an axis inclined with respect to the surface of the earth and lying at right angles to the spinning axis of the mass and a second member within which the first named member is mounted upon an axis inclined with respect to the surface of the earth and lying at right angles to the first named axis and to the spinning axis of the mass.

5. In a gyroscopic compass, a gyroscopic element comprising a rotor and a case, means for mounting the rotor and case upon mutually perpendicular supporting axes so that they may turn about a common inclined axis independently of each other, means for causing continuous rotation of the rotor about the common axis, said element being pendulous with respect to the supporting axes whereby it is caused to seek the meridian by the action of gravity thereon, and means for turning the case about the common axis during such meridian seeking movements, both of said supporting axes being inclined to the surface of the earth whereby oscillations of the element are damped by the joint action of the pendulous mounting of the element and the turning means.

In testimony whereof I affix my signature.

HARRY L. TANNER.